R. A. GOULD & C. S. ASH.
UTILIZATION OF WASTE FROM PINEAPPLE.
APPLICATION FILED FEB. 8, 1915.
1,166,674.
Patented Jan. 4, 1916.
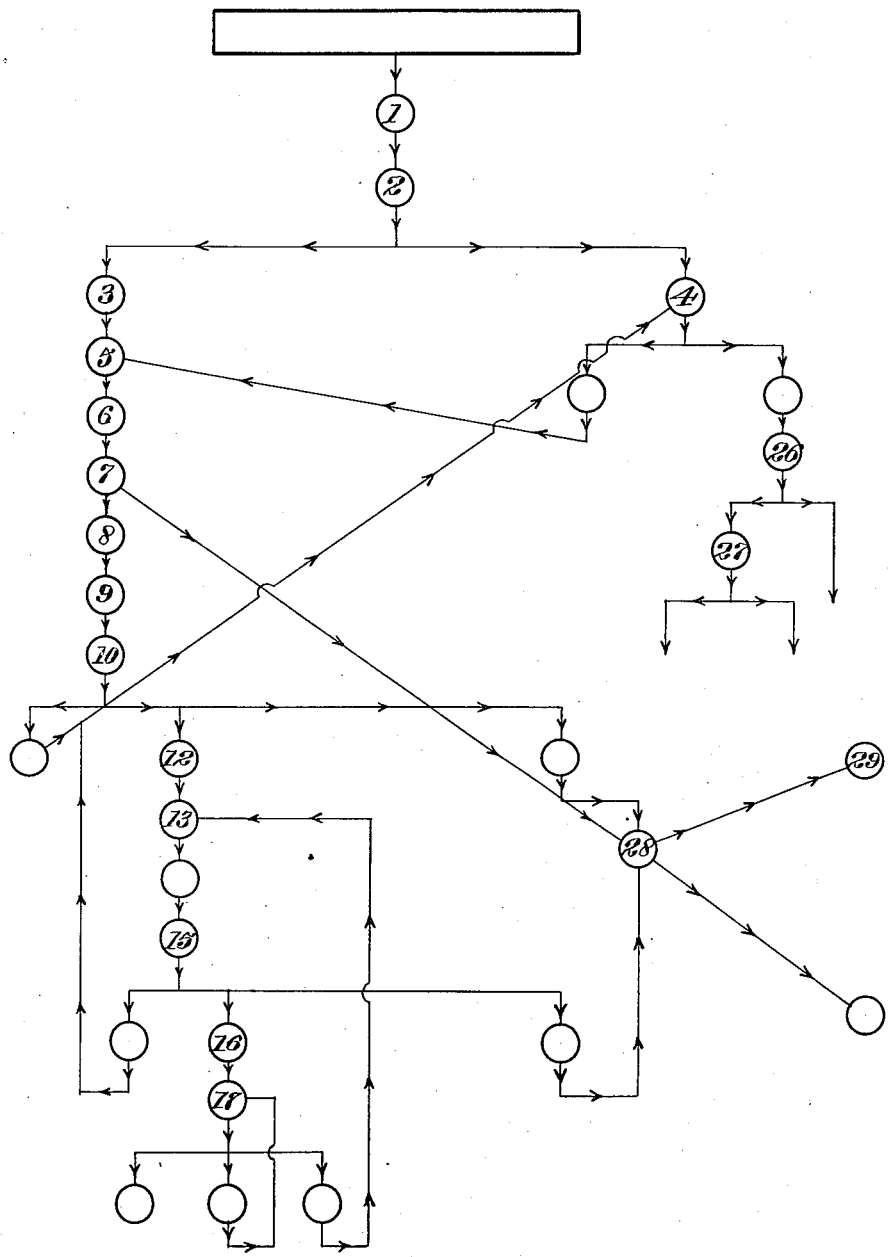

UNITED STATES PATENT OFFICE.

RALPH A. GOULD AND CHARLES S. ASH, OF SAN FRANCISCO, CALIFORNIA.

UTILIZATION OF WASTE FROM PINEAPPLE.

1,166,674. Specification of Letters Patent. Patented Jan. 4, 1916.

Application filed February 8, 1915. Serial No. 6,886.

*To all whom it may concern:*

Be it known that we, RALPH A. GOULD and CHARLES S. ASH, both citizens of the United States, residing at the city and county of San Francisco and State of California, have invented new and useful Improvements in Utilization of Waste from Pineapple, of which the following is a specification.
This invention relates to a method of treating pineapple waste with a view of utilizing and recovering values which have heretofore been a commercial loss; and to a novel fruit syrup resulting from such treatment. In the canning of pineapple it is customary after the fruit comes to the cannery to free it of its top and bottom wasteage and cut from the fruit by means of proper cutting machines a cylinder of fruit.
This cylinder of fruit with its core removed is sliced transversely into slices about one-half inch thick. These slices are put in containers and a syrup made from cane sugar is poured into the container to fill it and preserve the fruit. Several forms of canned and preserved pineapple are made and pineapple juice is also a product of the pineapple canning industry.

Owing to the fact that the size or diameter of the slices of fruit is governed by the size of the can, there is a large amount of waste product in preparing the cylinder of fruit from the pineapple. This wastage amounts to about fifty per cent. of the weight of the fruit delivered at the cannery. Save for the outside horn-like covering of the fruit, the waste is of the same approximate composition as the cylinder of fruit prepared by the cutting machines. The question of utilizing this enormous amount of waste is of paramount importance.

The object of our process is to recover, from what in the past has been an absolute waste and a source of expense to canners to dispose of, a commercial sugar syrup suitable for canning purposes, and in addition to such syrup, recover in a commercially salable condition such other constituent compounds and substances as may be contained in such previously considered waste product, by a system of pressings, treatments, mechanical transfers and combinations as hereinafter described. By our process this waste is so treated as to produce from it a sugar syrup suitable for canning purposes which is composed of invert sugar (d-fructose and d-glucose) and sucrose. The syrup contains a very small amount of some of the substances, other than sugar, contained in the fruit originally.

Other objects incidental to the process are the recovery of the citric acid contained in the fruit, either in the form of citrate of lime or other insoluble salt of citric acid, or as crystallized citric acid; further the recovery of the natural content of vegetable albumin in a form adaptable for use in various industries; and the utilization of the cellulose content of the waste.

Briefly and generally the process may be described as follows: The juice is removed from the waste by pressing or by diffusion, or by both pressing and diffusion. In the case of the use of a combination of pressing and diffusion, the waste, consisting of peelings, cores, meats, etc., of the pineapple not available for use in the canning industry, is prepared for pressing for the purpose of extracting all available free running juice. From this point two stages develop up to a definite point of the general process: 1st, the handling of the pressed pulp; 2nd, the handling of the pressed juice.

1. The pressed pulp is conveyed into a diffusion battery of various numbers of cells in which hot water under pressure is introduced in continuous method from cell to cell until the resulting juice indicates that practically all of the sugar content has been removed from the pulp. This resulting juice is pumped to a receiving tank and consolidated with pressed juice, at which point the process becomes identical for the two produced juices. The resulting pulp, from which the sugar and other substances have been removed by the diffusion process, is emptied from the cells, conveyed to presses and the water content squeezed out. The semi-dry pulp can be subsequently utilized, after additional drying, as a fuel, fertilizer, etc., as may be found desirable, at a very low cost.

2. The juices from the presses which deliver the available free running juice are passed through a centrifugal filter or a proper form of filter screen to remove vegetable fiber and coarse suspended matter and are then combined with the juice from the diffusion battery in the receiving tanks, above mentioned. The mixed juices are now heated to the correct temperature for coagulating the albumin, which is then separated by decantation or filtration. After separation of the albumin the juice is conveyed to mixing tanks to be chemically treated for the purpose of neutralizing the acid content of the juice. The neutralized juice is subjected to filtration or decantation to remove the insoluble citric acid salts and other products and then transferred to an evaporator where it is concentrated in vacuum to the desired amount. The concentrated juice is again filtered or decanted to remove any insoluble salts of citric acid that have been thrown down by the concentration together with any other products which have precipitated. The colored concentrated juice is then passed through proper medium to decolorize it and produce the final commercial sugar syrup suitable for canning purposes. And in addition to the above general outline, various and sundry methods of conserving wash waters, off colored syrup, reduced and concentrated juices developed in the process.

The drawing diagrammatically illustrates an apparatus readily comprehended by anyone skilled in the art, suitable for practising the invention.

Our process is novel and useful in the following respects: 1. It produces a commercial sugar syrup suitable for canning purposes from fruit juice, which syrup is composed chiefly of invert sugar (d-fructose and d-glucose) and sucrose. There are at present no sugars or sugar syrups recovered, commercially, from fruits, of which we are aware. No fruits contain only sucrose and few fruits contain only invert sugar (d-fructose and d-glucose); but all fruits contain invert sugar (d-fructose and d-glucose) or a mixture of invert sugar (d-fructose and d-glucose) and sucrose. The only sugars of extended commercial use or importance are sucrose (cane sugar, beet sugar or maple sugar) and dextrose (d-glucose) which is made from starch. The only commercial syrups now obtainable are sucrose syrup, which is made from either cane, beet or maple sugar; glucose syrup, made from starch and consisting of d-glucose, dextrin and allied bodies, which is usually sold under a trade or fancy name; invert sugar syrup, made by the hydrolysis of sucrose, and honey which is a natural product composed mainly of invert sugar, (d-glucose and d-fructose,) but containing some sucrose. There are no commercial sugar syrups produced from fruits. There are commercial fruit syrups which are in the main fruit juices sweetened with sucrose or cane sugar, although there do exist concentrated fruit juice syrups which are the fruit juice concentrated with all of its original constituents more or less intact in the concentrated product. There are no commercial sugar syrups suitable for canning purposes at present produced from fruit. 2. It produces commercial calcium citrate or other insoluble salts of citric acid, or citric acid from fruit juice, other than lemon juice, which latter is the only commercial source of citric acid at the present time. 3. It produces vegetable albumin, from fruit juice.

For the accomplishment of the new and novel processes and the production of the new and novel products the method of procedure is, advantageously as follows: The waste as it is produced at the cannery is prepared by suitable comminutors 1, for pressing, and is then run to presses 2 in which all of the available free running juice of the fruit is expressed. The pressed juice is strained through a centrifugal filter or a proper form of screen 3 to remove vegetable fiber and coarse suspended matter and is conveyed to a receiving tank 5. The pressed pulp is conveyed to an apparatus 4, known as a diffusion battery. The diffusion battery is advantageously of the type used in the extraction of sugar from beets. By maintenance of proper temperature and proper water supply the juice which remains in the pressed pulp is washed or diffused out of the pulp leaving it a mass of pulp composed only of cellulose and other substances insoluble in water. The preferred temperature for the diffusion water, as shown by practice, for this operation is 160° F. and the preferred pressure is 20 pounds per square inch. Temperatures and pressures greater than these permit more or less complete extraction and temperatures and pressures less than these also permit more or less complete extraction. The temperature 160° F. and the pressure 20 pounds per square inch are preferred in practice because much lower temperatures do not rapidly exhaust the pulp while much higher temperatures cause the sugar to decompose with the production of caramel and also cause the pulp to channel. Much lower pressures prevent the free flow of water and much higher pressures cause the pulp to mat and thus prevent complete diffusion. The diffused juice is pumped or conveyed to the receiving tank 5, where it is mixed with the strained pressed free running juice. The diffused pulp is then pressed at 26 to remove water and is then conveyed to a drying apparatus 27, of proper design, in which most of the water is driven off. From this point the dried pulp can be used as a by-product, per se, or be burned for its fuel value, and the ash (mineral matter) produced, can be sold as fertilizing material. The mixed juices from the receiving tank 5 are heated to a temperature of approximately 180° F., by proper apparatus as 6, to coagulate and precipitate the vegetable albumin which is held in solution. This temperature is preferred in practice, because much lower temperatures do not coagulate all of the albumin present and much higher temperatures produce decomposition products from the sugar, as caramel. The precipitated albumin is separated from the juice by decantation or filtration, by means of proper apparatus 7, and the resulting juice is conducted to a mixing tank 8 for neutralization.

In the mixing tank 8 the juice is treated with a neutralizing agent, which will produce an insoluble compound with citric acid, in such quantity as to reduce the acidity of the juice to an amount equal to or less than the acidity of N/20 acid and as to prevent the presence of an amount of alkali greater than the equivalent of N/50 alkali. The point of neutralization preferred in practice is to bring the acid content of the juice to a point approximately equal to that of N/100 acid. The neutralizing agent preferred in practice is lime (CaO) or whiting ($CaCO_3$); other agents available are salts of barium, strontium and various alkaline earths. During the neutralization process the juice is constantly or intermittently stirred, as indicated by the physical condition of the precipitate, by a proper stirring device and when the neutralization is finished the material is run to a storage tank 9. The mixture of neutralized juice and insoluble precipitate is then separated by decantation or filtration by suitable apparatus as 10. The insoluble precipitate is washed and conveyed to the citric acid recovery plant 29, with or without drying in a suitable drying apparatus 28 for working for its citric acid value, or the dried citrate can be sold as crude citrate. The filtered juice, now freed of its acid and containing the original sugar of the fruit, and citric acid salts in solution, is collected in a tank 12, and then conducted to a vacuum evaporator 13, where it is concentrated by proper operation of the concentrating apparatus to any sufficient degree of sugar strength suitable for a syrup suitable for canning purposes. During the concentration of the juice the greater portion of the salts held in solution precipitate out while the sugar is held in solution in the form of syrup. Upon obtaining sufficient degree of concentration the syrup with its precipitate is withdrawn from the evaporator and by suitable filtering or decanting apparatus as at 15, or other means, the insoluble precipitate is removed. The insoluble precipitate is washed and conveyed to the citric acid recovery plant 29 with or without drying in a suitable drying apparatus 28 for working for its citric acid value, or the dried citrate can be sold as crude citrate. The filtered syrup is conducted through a proper heating device 16, by means of which the temperature of the syrup is raised to the proper degree for effecting decolorization. By means of proper operation of the decolorizing system 17, there is produced as a final product a commercial sugar syrup suitable for canning purposes. This proper operation includes the control of the temperature of the syrup while it is in the decolorizing system. We have found the preferred temperature in practice, at which to keep the syrup to be 160° F., and the preferred decolorizing agent to be animal charcoal or (bone char). Temperatures higher than 160° F. produce caramel by the decomposition of the sugar, which substance is very difficult to remove from the syrup by the decolorizing agent. Temperatures lower than 160° F. decrease the capacity of the decolorizing agent. The final product, a commercial sugar syrup suitable for canning purposes, may contain a small part of the original coloring matter of the juice or none of it; it may contain a trace of the original acid of the fruit or none of it; it may contain a trace of the original mineral matter of the fruit or none of it, and it does contain all of the original sugar of the fruit. This sugar is not, however, in its original chemical composition. The sugar which exists in the ripe pineapple as it stands on the plant is composed, on the average, of approximately fifty per cent. sucrose and fifty per cent. of invert sugar (d-fructose and d-glucose). This invert sugar has the same chemical composition as the invert sugar which is formed by the inversion or hydrolysis of sucrose. The hydrolysis of sucrose can be accomplished by heat, or by the aid of acid or by both. When the pineapple is picked the natural acid of the fruit begins at once to hydrolyze or invert the sucrose which is present. By the time the fruit has been picked twenty four hours the sugar which existed while the fruit was on the plant has been modified so that the proportion of sucrose is materially reduced and the proportion of invert sugar (d-fructose and d-glucose) is increased by the amount produced by such inversion. These figures are more or less idealized as the total amount of sugar and the proportion of each constituent sugar depends upon the ripeness of the pineapple when it is picked and upon cultural conditions, soil and climate. The sugar in the commercial sugar syrup suitable for canning purposes as produced by our process consists, therefore, of the original invert sugar (d-fructose and d-glucose) which existed in the fruit, some of the original sucrose, which existed in the fruit (that which escaped inversion by the process) and the invert sugar (d-fructose and d-glucose) derived from the sucrose which has been inverted by the process.

In our process we contemplate the manufacture of citric acid direct from the fruit material without intermediate drying of the produced insoluble salts of citric acid by refining the freshly prepared insoluble salts of citric acid and also contemplate the manufacture of citric acid by refining the dried insoluble salts of citric acid by means of processes which are well known and old.

Throughout the entire process of manipulation of the pineapple material and the production of the various products the conditions of temperature must be proper and the control of the chemical reactions of the substances concerned must be proper or the products cannot be produced. This is particularly so with respect to the production of the commercial sugar syrup suitable for canning purposes.

Having thus described our invention, what we claim and desire to secure by Letters Patent is—

1. The process of treating pineapple, waste pineapple, and pineapple waste for the recovery of its cellulose, albumin, acid and sugar values, which comprehends comminuting the material, pressing the comminuted material, and diffusing the pressed comminuted material by the use of a diffusion battery with water at approximately 160° F. and 20 pounds per square inch pressure, and recovering the cellulose values as dried exhausted pulp.

2. The process of treating pineapple, waste pineapple, and pineapple waste for the recovery of its cellulose, albumin, acid and sugar values, which comprehends comminuting the material, pressing the comminuted material to remove juice from the pulp, straining the pressed juice, removing from the pulp the juice remaining therein by diffusion, mixing the pressed and diffused juice, heating the mixed juices to approximately 180° F. to coagulate and precipitate the albumin, and recovering the albumin as vegetable albumin.

3. The process of treating pineapple, waste pineapple and pineapple waste for the recovery of its cellulose, albumin, acid and sugar values, which comprehends comminuting the material, pressing the comminuted material to remove juice from the pulp, straining the pressed juice, removing from the pulp the juice remaining therein by diffusion, mixing the pressed and diffused juice, heating the mixed juices to approximately 180° F. to coagulate and precipitate the albumin, separating the said albumin, treating the resulting juices with a neutralizing agent, which will produce an insoluble compound with citric acid, in such quantity as to reduce the acidity of the juice to an amount approximately equal to N/100 acid, and recovering the citric acid in the form of insoluble citrate.

4. The process of treating pineapple, waste pineapple and pineapple waste for the recovery of its cellulose, albumin, acid and sugar values, which comprehends comminuting the material, pressing the comminuted material to remove juice from the pulp, straining the pressed juice, removing from the pulp the juice remaining therein by diffusion, mixing the pressed and diffused juice, heating the mixed juices to approximately 180° F. to coagulate and precipitate the albumin, separating the said albumin, treating the resulting juices with a neutralizing agent, which will produce an insoluble compound with citric acid, in such quantity as to reduce the acidity of the juice to an amount approximately equal to N/100 acid, separating the insoluble citrate, concentrating the resulting filtered juice under diminished pressure, and separating the resulting precipitated insoluble citrate.

5. The process of treating pineapple, waste pineapple and pineapple waste for the recovery of its cellulose, albumin, acid and sugar values, which comprehends comminuting the material, pressing the comminuted material to remove juice from the pulp, straining the pressed juice, removing from the pulp by diffusion the juice remaining therein, mixing the pressed and diffused juice, heating the mixed juices to approximately 180° F. to coagulate and precipitate the albumin, separating the said albumin, treating the resulting juices with a neutralizing agent, which will produce an insoluble compound with citric acid, in such quantity as to reduce the acidity of the juice to an amount approximately equal to N/100 acid, separating the insoluble citrate, concentrating the resulting filtered juice under diminished pressure, separating the resulting precipitated insoluble citrate, heating the resulting filtered syrup to approximately 160° F., decolorizing by a proper decolorizing agent such as animal or vegetable charcoal, and recovering the sugar value in the form of a sugar syrup suitable for canning purposes.

6. The process of recovering the saccharine content of fruit, which comprehends as a step therein, the treatment of the fruit juice with a neutralizing agent, which will produce an insoluble compound with the acid content in such quantity as to reduce the acidity of the juice to an amount equal to, or less than the acidity of N/20 acid, and as to prevent the presence of an amount of alkali greater than the equivalent of N/50 alkali.

7. The process of treating fruit for the recovery of its values, which comprehends crushing the pineapple to extract the juices, neutralizing the juices until their acidity is reduced to a point below N/20 acid and above N/50 alkali, filtering, concentrating and decolorizing the concentrate, and recovering the saccharine values as a neutral sugar syrup.

8. The process of treating waste pineapple for the recovery of its values, which comprehends extracting the natural juices from the pineapple, passing the juices through centrifugal machines to remove the vegetable fiber, heating the liquid product to approximately 180° F., neutralizing the heated juices, filtering, recovering the calcium citrate as a result of said filtration, concentrating the liquor and during concentration maintaining the temperature at not to exceed 200° F., filtering the liquor again at a temperature between 130° F. and 160° F., and decolorizing the filtered liquor, maintaining the liquor during the decolorizing at approximately 165° F.

9. The process of treating waste pineapple for the recovery of its values, which consists in expressing the juice of the pineapple, heating the juice to approximately 180° F., neutralizing the juice with slack lime until its acidity is reduced to a point below that represented by N/100 acid, and then filtering the neutralized juice and removing the precipitate of calcium citrate.

10. The process of extracting pineapple pulp which comprises diffusing the same at a temperature of about 160° F. and a pressure of about 20 lbs. per square inch.

11. The process of treating pineapple juice and extract which comprises heating the same to a temperature sufficient to coagulate the vegetable albumin therein, and concentrating the resulting albumin-free liquid to produce a fruit syrup.

12. The process of treating pineapple juice and extract which comprises heating the same to a temperature of about 180° F. to coagulate the vegetable albumin therein, and concentrating the resulting albumin-free liquid to produce a fruit syrup.

13. The process of treating pineapple juice and extract which comprises neutralizing the acid therein with a neutralizing agent forming insoluble salts with citric acid, and concentrating the neutralized liquid to produce a fruit syrup.

14. As a new article of manufacture, a fruit syrup comprising pineapple juice substantially freed from vegetable albumin and concentrated to syrup consistency.

15. As a new article of manufacture, a fruit syrup comprising pineapple juice substantially freed from acid and concentrated to syrup consistency.

16. As a new article of manufacture, a fruit syrup comprising pineapple juice substantially freed from acid and from vegetable albumin and concentrated to syrup consistency.

17. As a new article of manufacture, a fruit syrup comprising concentrated fruit juices containing invert sugar associated with sucrose, and substantially free from acid and vegetable albumin.

18. As a new article of manufacture, a fruit syrup suitable for canning purposes comprising concentrated pineapple juice substantially free from acid and vegetable albumin, and containing de-fructose and d-glucose associated with sucrose.

In testimony whereof we have hereunto set our hands in the presence of two subscribing witnesses.

RALPH A. GOULD.
CHARLES S. ASH.